United States Patent
Aikawa et al.

(10) Patent No.: US 8,972,595 B2
(45) Date of Patent: Mar. 3, 2015

(54) COMMUNICATION APPARATUS, APPLICATION COMMUNICATION EXECUTING METHOD, AND COMPUTER PROGRAM PRODUCT, CONFIGURED TO SELECT SOFTWARE COMMUNICATION OR HARDWARE COMMUNICATION, TO EXECUTE APPLICATION COMMUNICATION, BASED ON REFERENCE INFORMATION FOR APPLICATION COMMUNICATION

(75) Inventors: Tomonori Aikawa, Tokyo (JP); Takashi Kubota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1080 days.

(21) Appl. No.: 12/128,051

(22) Filed: May 28, 2008

(65) Prior Publication Data

US 2008/0313343 A1    Dec. 18, 2008

(30) Foreign Application Priority Data

Jun. 18, 2007 (JP) .................. 2007-159943

(51) Int. Cl.
G06F 15/16 (2006.01)
H04L 29/06 (2006.01)

(52) U.S. Cl.
CPC ............ H04L 69/16 (2013.01); H04L 63/0485 (2013.01); H04L 69/161 (2013.01)
USPC .......................................... 709/230; 709/228

(58) Field of Classification Search
CPC .................................................. H04L 63/0485
USPC ......................................................... 709/230
See application file for complete search history.

(56) References Cited

U.S. PATENT DOCUMENTS 7,007,103 B2 * 2/2006 Pinkerton et al. ............. 709/238
7,535,913 B2 * 5/2009 Minami et al. ................ 370/401

(Continued)

FOREIGN PATENT DOCUMENTS

JP    2002-354064    12/2002
JP    2006-14143     1/2006

(Continued)

OTHER PUBLICATIONS

Jun. 14, 2011 Japanese official action in connection with a counterpart Japanese patent application.

*Primary Examiner* — Aaron Strange
(74) *Attorney, Agent, or Firm* — Cooper & Dunham LLP

(57) ABSTRACT

A software communication unit executes a plurality of application communications executed in parallel in a network according to a TCP/IP control by a software. A hardware communication unit executes the application communications according to a TCP/IP control by a TCP/IP offload engine (TOE). A communication allocating unit executes an allocation processing for allocating a hardware communication by the hardware communication unit and a software communication by the software communication unit based on reference information on each of the application communications, for application communications that are simultaneously executed.

16 Claims, 10 Drawing Sheets

(56) References Cited

U.S. PATENT DOCUMENTS

| | | | |
|---|---|---|---|
| 7,639,715 B1 * | 12/2009 | O'Neil et al. | 370/474 |
| 7,783,880 B2 * | 8/2010 | Pinkerton et al. | 713/151 |
| 8,006,297 B2 * | 8/2011 | Johnson et al. | 726/15 |
| 2003/0161327 A1 * | 8/2003 | Vlodavsky et al. | 370/395.52 |
| 2004/0249957 A1 * | 12/2004 | Ekis et al. | 709/228 |
| 2005/0188074 A1 * | 8/2005 | Voruganti et al. | 709/224 |
| 2006/0013128 A1 * | 1/2006 | Connor et al. | 370/229 |
| 2006/0104308 A1 * | 5/2006 | Pinkerton et al. | 370/469 |
| 2007/0061565 A1 * | 3/2007 | Valenci et al. | 713/150 |
| 2007/0162631 A1 * | 7/2007 | Balakrishnan et al. | 710/15 |
| 2007/0174479 A1 * | 7/2007 | Sperry et al. | 709/233 |

FOREIGN PATENT DOCUMENTS

| | | |
|---|---|---|
| JP | 2006-191537 | 7/2006 |
| JP | 2006-293983 | 10/2006 |
| JP | 2006-319971 | 11/2006 |
| JP | 2007-201785 | 8/2007 |
| JP | 2007-235715 | 9/2007 |
| JP | 2007-235853 | 9/2007 |
| JP | 2008-61223 | 3/2008 |

* cited by examiner

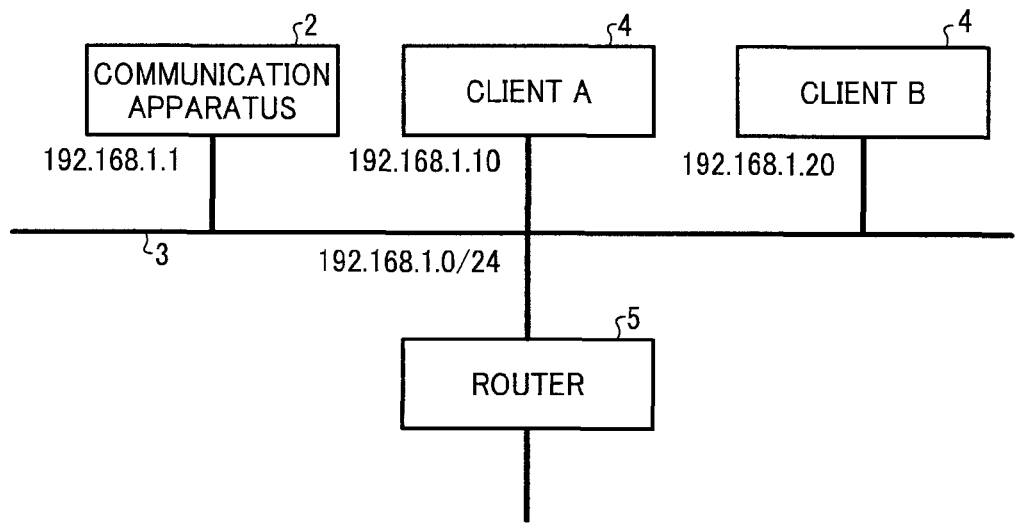
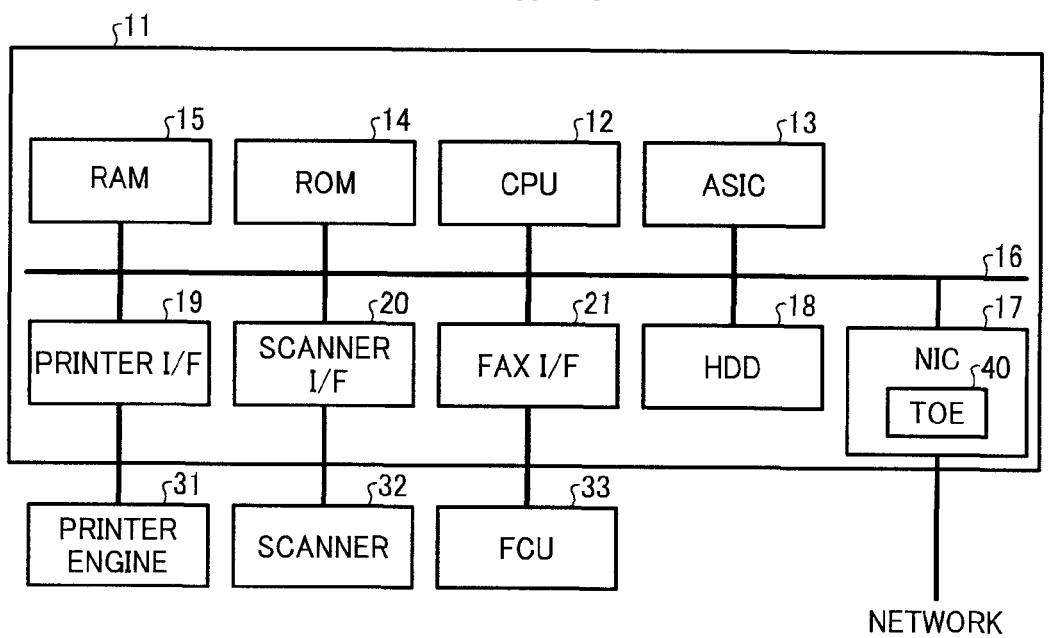

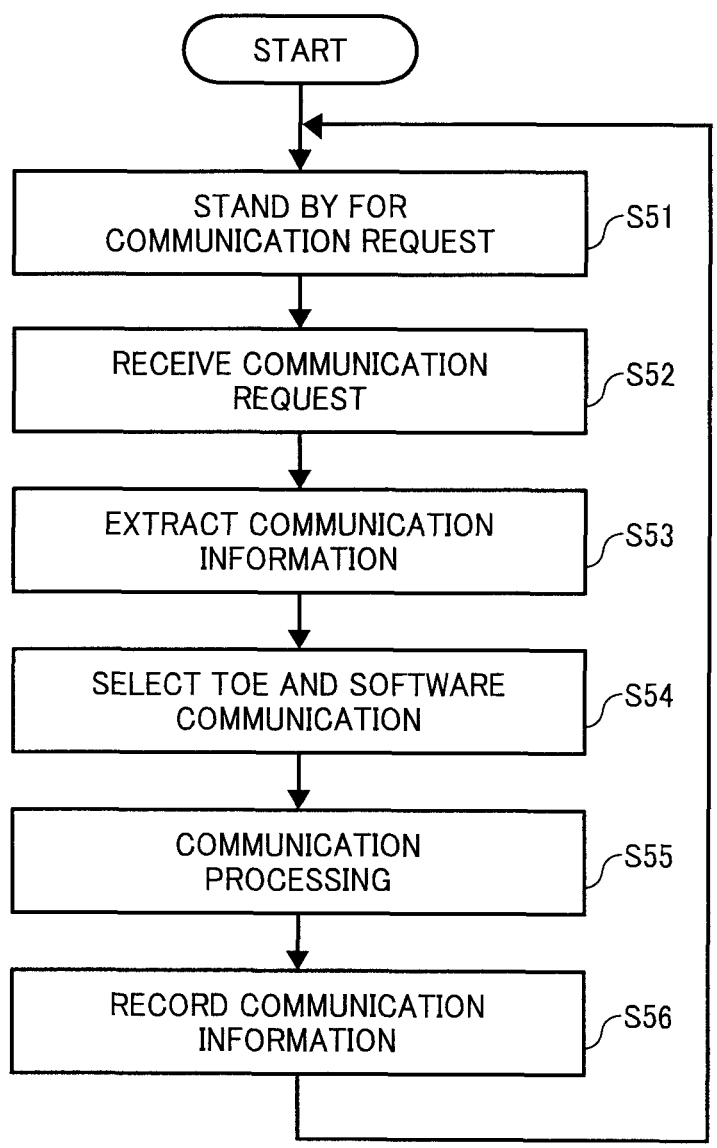

COMMUNICATION APPARATUS, APPLICATION COMMUNICATION EXECUTING METHOD, AND COMPUTER PROGRAM PRODUCT, CONFIGURED TO SELECT SOFTWARE COMMUNICATION OR HARDWARE COMMUNICATION, TO EXECUTE APPLICATION COMMUNICATION, BASED ON REFERENCE INFORMATION FOR APPLICATION COMMUNICATION

CROSS-REFERENCE TO RELATED APPLICATIONS

The present application claims priority to and incorporates by reference the entire contents of Japanese priority document 2007-159943 filed in Japan on Jun. 18, 2007.

BACKGROUND

1. Technical Field

This disclosure relates to a communication apparatus, a method of executing a plurality of application communications on a network, and a computer program product.

2. Description of the Related Art

In a TCP/IP communication, which is a protocol typically used in the Internet and an intranet, a protocol processing for the communication is performed by central processing units (CPUs) of network servers and the like that handle network data. Such a protocol processing imposes a heavy load on the CPUs.

In recent years, network speed has been increased to be higher than speed that the CPUs can process.

Therefore, to reduce the load of the network processing in the network servers, a solution called Transmission Control Protocol/Internet Protocol (TCP/IP) offload Engine (TOE) is proposed (see, for example, Japanese Patent Application Laid-open No. 2006-014143). The TOE is a hardware version of network protocol processing that requires long CPU processing time in the network processing, checksum processing for network protocols, and the like. More specifically, the TOE is a hardware for consistently applying TCP/UDP header processing and IP header processing to a packet formed by upper layers of a TCP layer in an open system interconnection (OSI) seven-layer reference model. The TOE can reduce CPU loads of the network servers by partially or entirely performing the network processing (TCP/IP processing). In general, communication subjected to hardware processing operates faster than software processing. Therefore, it is possible to improve an overall system throughput.

However, because the TOE is hardware implementation, communication ability substantially depends on hardware limitations such as a memory capacity. Specifically, the TOE has a large influence on the number of sessions. In some case, a communication upper limit is limited to about several sessions to several tens sessions. Such a problem does not occur when a hardware configuration has a sufficient ability for necessary communication. However, this is often impossible because of a reduction in size and a reduction in cost.

As a solution for such a problem, a method of properly using both hardware communication by the TOE and software communication is conceivable. It is possible to prevent problems such as the upper limit of the number of sessions by using the software communication in the past for communication to which the TOE cannot be allocated.

However, when the method described above is adopted, a method of properly using the hardware communication and the software communication substantially affects communication performance of communication as a whole. For example, when "TOE is allocated in order from communication started earlier" as a simple method of properly using the hardware communication and the software communication, even if there is communication started later having both large traffic and high communication frequency, the software communication is allocated to the communication. If the TOE can be preferentially allocated to such communication, performance of communication as a whole can be improved. The improvement of communication performance does not mean a simple increase in average communication speed but indicates overall optimization of communication on condition that the TOE is allocated to necessary communication even if the average communication speed is decreased. For example, if there is communication for which it is desired to use the TOE because of communication speed even if traffic is small and frequency is low, the TOE should be allocated to the communication.

In other words, realized communication performance depends on an environment of use of a communication apparatus. In a certain environment, an increase in the average communication speed is required as communication performance, in another environment, an increase in communication speed is required for specific communication, and in still another environment, an increase in communication speed is required for security communication.

BRIEF SUMMARY OF THE INVENTION

According to an aspect of this disclosure, there is provided a communication apparatus including a software communication unit that executes a plurality of application communications executed in parallel in a network according to a transmission control protocol/Internet protocol control by a software; a hardware communication unit that executes the application communications according to a transmission control protocol/Internet protocol control by a transmission control protocol/Internet protocol offload engine; and a communication allocating unit that executes an allocation processing for allocating a hardware communication by the hardware communication unit and a software communication by the software communication unit based on reference information on each of the application communications, for application communications that are simultaneously executed.

According to another aspect, there is provided a method of executing a plurality of application communications executed in parallel in a network. The method includes allocating a software communication by a software communication unit that executes the application communications according to a transmission control protocol/Internet protocol control by a software and a hardware communication by a hardware communication unit that executes the application communications according to a transmission control protocol/Internet protocol control by a transmission control protocol/Internet protocol offload engine, based on reference information on each of the application communications, for application communications that are simultaneously executed.

According to still another aspect, there is provided a computer program product comprising a computer-usable medium having computer-readable program codes embodied in the medium for executing a plurality of application communications executed in parallel in a network. The computer-readable program codes when executed cause a computer to execute a software communication by a software communication unit that executes the application communications according to a transmission control protocol/Internet protocol control by a software and a hardware communication by a hardware communication unit that executes the application communications according to a transmission control protocol/Internet protocol control by a transmission control protocol/Internet protocol offload engine, based on reference information on each of the application communications, for application communications that are simultaneously executed.

The above and other aspects, features, advantages and technical and industrial significance will be better understood by reading the following detailed description of presently preferred embodiments of the invention, when considered in connection with the accompanying drawings.

BRIEF DESCRIPTION OF THE DRAWINGS

FIG. 3 is a block diagram of a network configuration of an information processing system according to a first embodiment of the present invention;

FIG. 4 is a block diagram of the structure of a communication apparatus;

FIG. 13 is a flowchart of a flow of communication control processing according to a sixth embodiment of the present invention.

DETAILED DESCRIPTION OF THE PREFERRED EMBODIMENTS

Exemplary embodiments of the present invention are explained in detail below with reference to the accompanying drawings.

In the following explanation, a TCP/IP offload Engine (TOE) is briefly explained and, then, an information processing system including a communication apparatus according to an embodiment of the present invention is explained.

The TOE means a function of performing TCP/IP protocol processing in place of a central processing unit (CPU) of a network server or the like that handles network data or a network adapter having such a function. The TOE is mainly mounted on printed boards such as a network interface card (NIC), a host bus adapter (HBA), and an internet SCSI (iSCSI).

Figure 1:
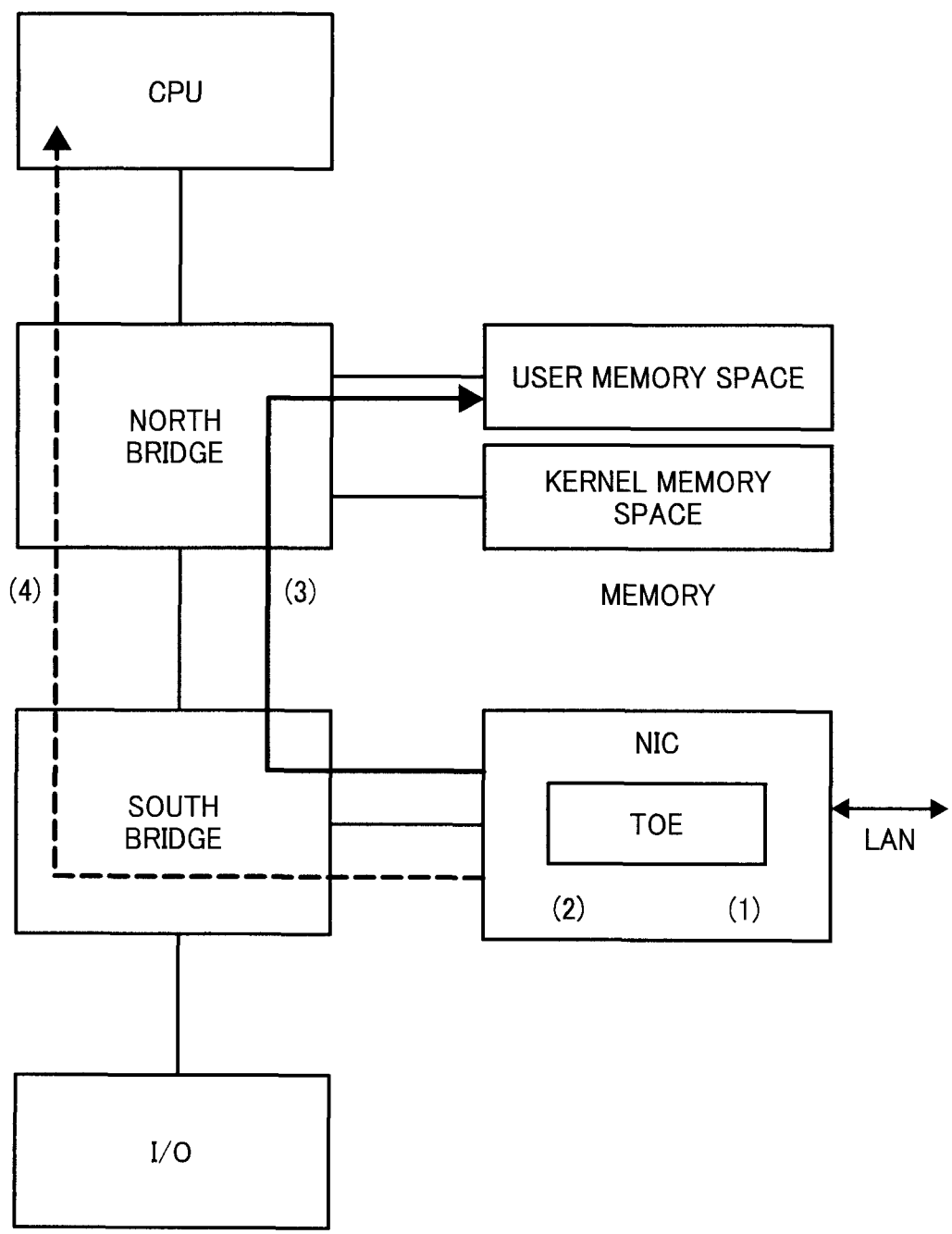
FIG. 1 is a schematic diagram of an example of data movement by a TOE as a premise of the present invention.

The TOE is software for consistently applying TCP/UDP header processing and IP header processing to a packet formed by layers higher in order than a TCP layer in an OSI reference model. The TOE, which includes hardware as described above, can reduce a CPU load by partially or entirely performing network processing (TCP/IP processing). In general, communication subjected to hardware processing operates faster than software processing. Therefore, it is possible to improve throughput of the system FIG. 1 is a schematic diagram of an example of data movement by a TOE as a premise of the present invention. As shown in FIG. 1, first, when a packet is received by a network interface card (NIC), the packet is loaded to the TOE (1). The TOE processes a TCP/IP header (2) and, then, copies data from a NIC memory to a user memory space (3). Thereafter, the NIC interrupts a CPU and instructs the CPU to make the packet usable by a user.

Figure 2:
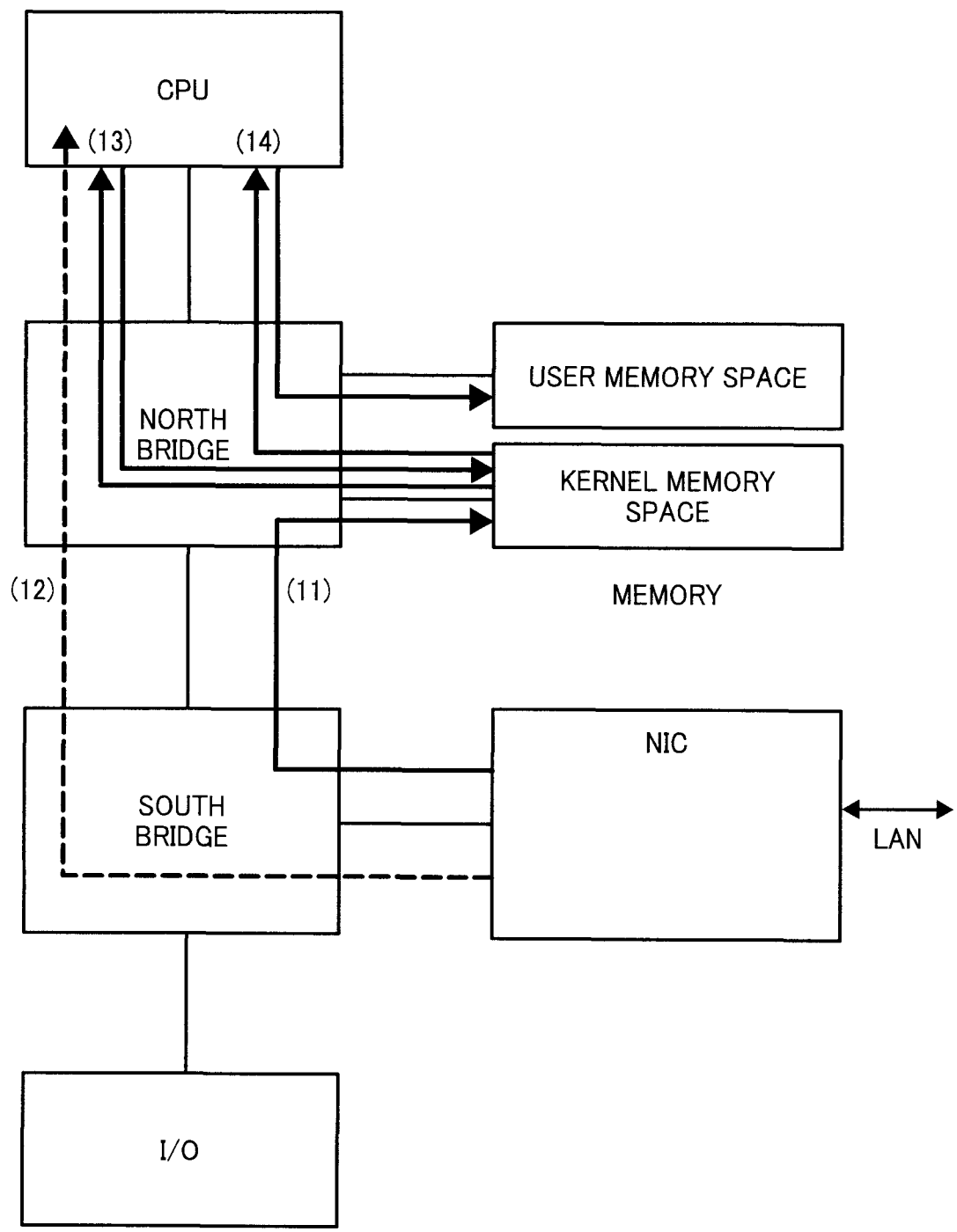
FIG. 2 is a schematic diagram of an example of data movement in the past.

For comparison, network movement in the past is explained referring to FIG. 2.

As shown in FIG. 2, when the packet is received by the NIC, the packet is moved to a driver/kernel memory space (11). Subsequently, a network controller interrupts the CPU and signals the reception of the packet (12). Thereafter, the CPU processes the TCP/IP header (13) and, then, copies the packet from the kernel memory space to a user memory space using a direct memory access (DMA) engine (14).

As shown in FIG. 2, conventionally, data movement needs to be performed a plurality of times by the CPU. In the data movement, the CPU needs to read data from the memory, correct the data as required, and write the data in and return the data to the memory. Such data movement by the CPU is likely to cause a failure in memory access and increases a CPU load. On the other hand, in the data movement in the TOE shown in FIG. 1, the CPU does not need to execute the sequence of writing the data from the memory, correcting the data, and writing the data in the memory. Therefore, it is possible to reduce a CPU load.

In other words, the TOE plays a role of reducing a burden on the CPU, increasing speed of processing, and improving throughput of the system by partially or entirely carrying out the TCP/IP processing, which conventionally consumes CPU resources on the host side. Consequently, it is possible to allocate the CPU resources on the host side to only the application processing that the CPU has to perform originally.

A first embodiment of the present invention is explained referring to FIGS. 3 to 6. In this embodiment, a so-called multifunction peripheral (MFP) is applied as a communication apparatus.

FIG. 3 is a block diagram of a network configuration of an information processing system 1 according to the first embodiment. As shown in FIG. 3, the information processing system 1 according to this embodiment is assumed to be a system in which a communication apparatus 2 and a plurality of client computers (hereinafter, "clients") 4, which communicate with the communication apparatus 2, are connected through a network 3. A router 5 that relays connection among communication apparatuses is connected to the network 3. For example, the router 5 relays communication with clients (not shown) and the like on the Internet. As the communication apparatus 2 according to this embodiment, a so-called multifunction peripheral (MFP) having a copy function, a facsimile (FAX) function, a print function, a scanner function, a function of delivering input images (an original image scanned by the scanner function and an image input by the print function or the FAX function), and the like is applied. In FIG. 3, a configuration in an IPv4 network is shown. However, because the present invention does not depend on an IP version, the network can be configured regardless of whether the IP version is IPv4 or IPv6.

FIG. 4 is a block diagram of the structure of the communication apparatus 2. As shown in FIG. 4, the communication apparatus 2 includes a controller 11 that performs various kinds of control processing such as control processing for the respective units of the communication apparatus 2 and image formation processing. The controller 11 includes a central processing unit (CPU) 12 that performs operation control for the communication apparatus 2. An application specific integrated circuit (ASIC) 13 that shows a predetermined function, a read only memory (ROM) 14 for storing programs executed by the CPU 12 and the ASIC 13, necessary data, and the like, and a random access memory (RAM) 15 for forming a work area and the like for the CPU 12 are connected to the CPU 12 via an internal bus 16.

A network interface card (NIC) 17, a hard disk drive (HDD) 18, a printer interface (I/F) 19 as an interface for a printer engine 31, a scanner I/F 20 as an interface for a scanner 32, and a FAX I/F 21 as an interface for a fax control unit (FCU) 33 are also connected to the CPU 12 via the internal bus 16. Exchange of data among these components is mainly performed via the internal bus 16.

The NIC 17 is an interface card built in the communication apparatus 2 to connect the communication apparatus 2 to the network 3. For example, the NIC 17 performs operations for connecting the clients 4 through the network 3, receiving print data and the like from the clients 4, and transmitting print result information and the like to the client 4. In this embodiment, the NIC 17 includes a TCP/IP offload Engine (TOE) 40, which is the TOE described above.

The HDD 18 stores document data information and various data such as document data and print data.

Figure 5:
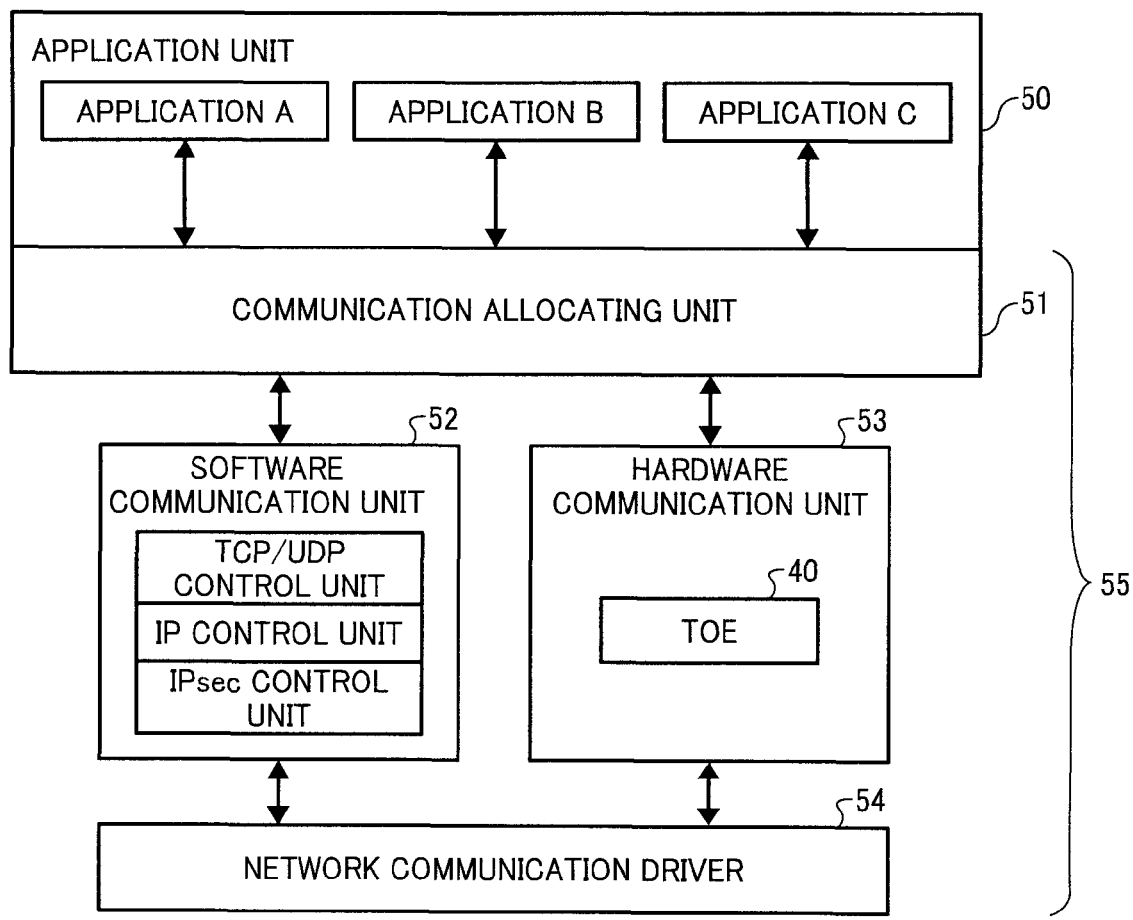
FIG. 5 is a block diagram of the structure of a communication control unit.

FIG. 5 is a block diagram of the structure of a communication control unit 55 that executes communication control processing, which is a characteristic function among functions realized by the CPU 12 of the controller 11 of the communication apparatus 2 according to programs. Most of the communication control processing is realized by a program, i.e., using communication control software. In this embodiment, a hardware version of the communication control software for an increase in speed of processing is also treated as a part of the communication control software.

As shown in FIG. 5, the communication control unit 55 roughly includes four units. More specifically, the communication control unit 55 includes an application unit 50, a software communication unit 52, a hardware communication unit 53, and a network communication driver 54. These components are necessary minimum components. It is possible to execute higher-function communication control processing by adding other devices and modules. For example, it is possible to record relayed packet information and obtain a log output and statistic information by incorporating log acquisition modules in the software communication unit 52 and the hardware communication unit 53.

The application unit 50 performs processing concerning applications provided to a user of the communication apparatus 2.

The software communication unit 52 is a unit that performs TCP/IP control using software. The software communication unit 52 has a TCP/UDP control unit, an IP control unit, and an IPsec control unit.

The hardware communication unit 53 is a unit that performs TCP/IP control using hardware, i.e., the TOE 40.

The network communication driver 54 is a unit that performs hardware control for network communication. Specifically, the network communication driver 54 corresponds to a protocol of a data link layer in the OSI 7-layer reference model.

As shown in FIG. 5, the application unit 50 includes a communication allocating unit 51 functioning as communication allocating means. The communication allocating means is a module that exclusively performs processing for allocating hardware communication by the hardware communication unit 53 or software communication by the software communication unit 52 to communication. Because all the applications are communicated via the communication allocating unit 51, the communication allocating unit 51 can perform processing for allocating the hardware communication by the hardware communication unit 53 or the software communication by the software communication unit 52 to a plurality of application communications.

The communication control unit 55 includes the communication allocating unit 51, the software communication unit 52, the hardware communication unit 53, and the network communication driver 54 described above.

Figure 6:
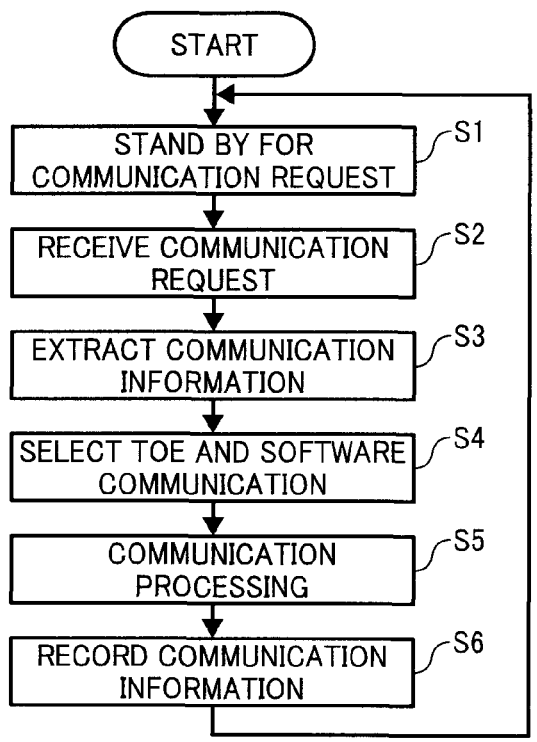
FIG. 6 is a flowchart of a flow of communication control processing.

FIG. 6 is a flowchart of a flow of communication control processing by the communication control unit 55.

As shown in FIG. 6, the communication control unit 55 stands by for a communication request (Step S1), receives a communication request from an application (Step S2), and extracts communication information from the communication request (Step S3). Communication information (reference information) extracted at Step S3 is information related to traffic of a plurality of application communications, for example, traffic in the past for each of the applications of the application unit 50. The traffic in the past for each of the applications is recorded in the RAM 15 and the HDD 18.

Subsequently, the communication control unit 55 performs processing for selecting the hardware communication by the hardware communication unit 53 or the software communication by the software communication unit 52 from the communication information in the past extracted at Step S3 (Step S4).

The selection processing is processing for determining, based on a relative relation of information related to the traffic of the application communications, to which application communication the hardware communication by the hardware communication unit 53 should be preferentially allocated. Specifically, the selection processing is processing for determining whether the hardware communication by the hardware communication unit 53 should be preferentially allocated to a predetermined application communication by comparing traffic of the application communication with traffic of the other application communications that are likely to be performed simultaneously with the application communication. In this embodiment, simply, the hardware communication by the hardware communication unit 53 is preferentially allocated to hardware communication with large traffic in the past. This is because application communication with large traffic in the past is predicted to have large traffic in future as well. In this embodiment, the communication allocating unit 51 records traffic for each of application communications in a recording device such as the HDD 18, and uses the traffic as a reference for allocation of the hardware communication unit 53.

Thereafter, the communication control unit 55 executes communication processing for transmitting data from a predetermined application using the selected hardware communication or software communication (Step S5). The communication control unit 55 records traffic of the application communication in the RAM 15 and the HDD 18 as communication information (Step S6), and stands by for the next communication request (Step S1).

For example, when traffic of Web communication allocated to the software communication by the software communication unit 52 is relatively large compared with that of the other application communications, the Web communication is dynamically allocated to the hardware communication by the hardware communication unit 53 in a session generated anew in the standby for reception.

In this embodiment, communication information related to traffic of a plurality of application communications is set as total traffic in the past of each of the applications of the application unit 50. However, the present invention is not limited to this. For example, average traffic in one communication for each of the applications obtained by dividing the total traffic in the past for each of the applications by the number of times of communication can be set as the communication information. The communication information is not limited to traffic and can be communication frequency and the like. The traffic can be recorded in a unit other than the application (a communication user, etc.) and information related to the traffic can be used for allocation of communication.

In this way, according to this embodiment, concerning a plurality of application communications simultaneously executed, processing for allocation to the hardware communication by the hardware communication unit 53 or the software communication by the software communication unit 52 is executed based on reference information concerning the respective application communications. This makes it possible to realize improvement of communication performance in the overall communication by appropriately selecting the reference information concerning the respective application communications according to an environment of use of the communication apparatus.

More specifically, the hardware communication by the hardware communication unit 53 is preferentially allocated to application communication with relatively a large numerical value concerning information (reference information) related to total traffic in the past of each of a plurality of application communications simultaneously executed. This makes it possible to realize improvement of communication performance (an increase in average communication speed) in the overall communication by allocating the TOE 40 to communication with larger "traffic".

In this embodiment, the communication allocating unit 51 itself analyzes information (reference information) related to traffic of a plurality of application communications simultaneously executed and executes processing for allocation to the hardware communication by the hardware communication unit 53 or the software communication by the software communication unit 52 for the respective application communications. This makes it possible to realize improvement of communication performance in the overall communication.

Figure 7:
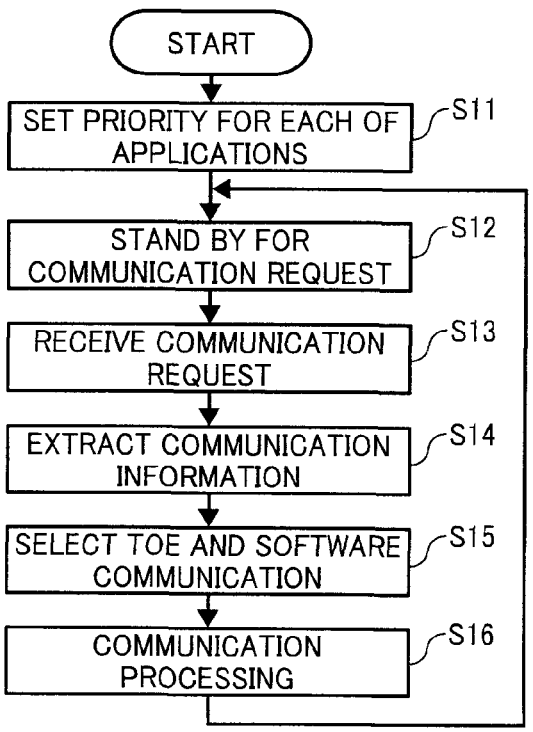
FIG. 7 is a flowchart of a flow of communication control processing according to a second embodiment of the present invention.

A second embodiment of the present invention is explained referring to FIG. 7. Components same as those in the first embodiment are denoted by the same reference numerals and signs and explanation of the components is omitted.

In the first embodiment, the communication allocating unit 51 performs the processing for allocation of the hardware communication and the software communication based on the relative relation of information related to traffic of a plurality of application communications. The second embodiment is different from the first embodiment in that the processing for allocation of the hardware communication and the software communication is performed according to priority of application communication (reference information) determined in advance.

In this embodiment, the client 4 performs application communication for "setting" and "printing" to the communication apparatus 2. An example of reception is described in this embodiment. However, it goes without saying that transmission is performed in the same manner.

FIG. 7 is a flowchart of a flow of communication control processing by the communication control unit 55. As shown in FIG. 7, first, the communication control unit 55 receives setting of priority of each of the applications (Step S11). For example, an amount of data for "printing" is larger than an amount of data that should be communicated for "setting". Therefore, in this embodiment, priority of the application communication for "setting" is set low and priority of the application communication for "printing" is set high. Such priority of each of the applications is recorded in the RAM 15 and the HDD 18.

Thereafter, the communication control unit 55 stands by for a communication request (Step S12), receives a communication request "reception standby" from an application (Step S13), and extracts communication information from the communication request (Step S14). The communication information extracted at Step S14 is priority of the application to be communicated.

Subsequently, the communication control unit 55 performs processing for selecting the hardware communication by the hardware communication unit 53 or the software communication by the software communication unit 52 based on the communication information (priority of the application) extracted at Step S14 (Step S15).

The selection processing is processing for determining whether the hardware communication by the hardware communication unit 53 should be preferentially allocated to a predetermined application communication by comparing priority of the application communication with priority of the other application communications that are likely to be performed simultaneously with the application communication. In this embodiment, priority of the application communication for "printing" is set higher than priority of the application communication for "setting". Therefore, the hardware communication by the hardware communication unit 53 is preferentially allocated to the application communication for "printing". It is also possible to set priority in finer function units by degrading granularity of the applications.

Thereafter, the communication control unit 55 executes communication processing for performing reception standby for "setting", for which priority is set low, in the software communication and performing reception standby for "printing", for which priority is set high, in the hardware communication (Step S16) and stands by for the next communication request (Step S12).

Consequently, when the application communication for "setting" is received from the client 4, the communication apparatus 2 receives a reception packet in the software communication unit 52 through the network communication driver 54, processes the reception packet, and passes the reception packet to the application unit 50. In other words, when the application communication for "setting" is received from the client 4, low-speed communication by the software processing is performed. On the other hand, when the application communication for "printing" is received from the client 4, the communication apparatus 2 can receive a reception packet in the TOE 40 of the hardware communication unit 53 through the network communication driver 54, process the reception packet, and pass the reception packet to the application unit 50. In other words, when the application communication for "printing" is received from the client 4, high-speed communication by the hardware processing is performed.

In this way, according to this embodiment, the hardware communication by the hardware communication unit 53 is preferentially allocated to application communication with high priority by referring to the priority (reference information) set in advance for a plurality of application communications simultaneously executed. Therefore, the TOE 40 is allocated to application communication with higher "priority of an application". This makes it possible to realize improvement of communication performance in the overall communication (distribution of communication speed corresponding to necessity of speed of communication to the respective applications).

Even in an identical application, for example, "print control information" transmission and "print data" reception are performed. In such a case, the communication allocating unit 51 can preferentially allocate the hardware communication by the hardware communication unit 53 to application communication with high priority ("print data" reception) and allocate the software communication by the software communication unit 52 to application communication with low priority ("print control information" transmission).

In this embodiment, the communication allocating unit 51 receives, from the outside, priority (reference information) set in advance for each of a plurality of application communications simultaneously executed and executes the processing for allocation of the hardware communication by the hardware communication unit 53 or the software communication by the software communication unit 52 to the respective application communications. This makes it possible to realize improvement of communication performance in the overall communication.

In the case of an application for creating a new socket when communication is received and starting reception (e.g., Web communication and print reception), when a certain number of communications are received, the communication allocating unit 51 can change the hardware communication by the hardware communication unit 53 to the software communication by the software communication unit 52 according to occupancy of a session. In this case, the communication allocating unit 51 itself analyzes information (reference information) concerning traffic of a plurality of application communications simultaneously executed and executes processing for allocation of the hardware communication by the hardware communication unit 53 or the software communication by the software communication unit 52 to the respective application communications. This makes it possible to realize improvement of communication performance in the overall communication.

Figure 8:
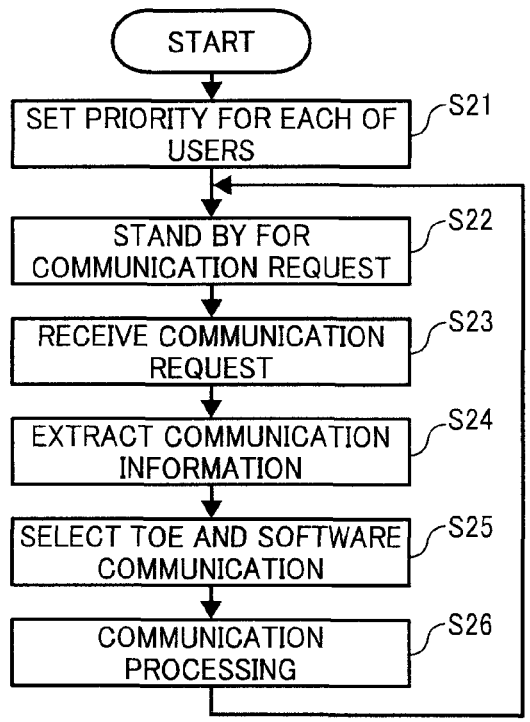
FIG. 8 is a flowchart of a flow of communication control processing according to a third embodiment of the present invention.

A third embodiment of the present invention is explained referring to FIG. 8. Components same as those in the first embodiment are denoted by the same reference numerals and signs and explanation of the components is omitted.

In the first embodiment, the communication allocating unit 51 performs the processing for allocation of the hardware communication and the software communication based on a relative relation of information related to traffic of a plurality of application communications. However, the third embodiment is different from the first embodiment in that the processing for allocation of the hardware communication and the software communication is performed according to priority for each of users for application communication (reference information).

In this embodiment, the communication apparatus 2 performs application communication to the client 4 used by a general user and the client 4 used by an accounting user. In this embodiment, an example of scan data transmission is described. However, it goes without saying that transmission and reception of other data can be performed in the same manner. Priority for users does not always have to be judged according to accounting. Various methods such as a method of judging priority for users according to user information set in advance are conceivable.

FIG. 8 is a flowchart of a flow of communication control processing by the communication control unit 55. As shown in FIG. 8, first, the communication control unit 55 receives setting of priority for each of the users (Step S21). Such priority for each of the users can be received from an account list of an application. In this embodiment, for example, priority of application communication of the accounting user is set high and priority of application communication of the general user (not-accounting) user is set low. Such priority for each of the users is recorded in the RAM 15 and the HDD 18.

Thereafter, the communication control unit 55 stands by for a communication request (Step S22), receives a communication request from the application (Step S23), and extracts communication information from the communication request (Step S24). The communication information extracted at Step S24 is priority for a user related to application communication.

Subsequently, the communication control unit 55 performs, using the communication allocating unit 51, processing for selecting the hardware communication by the hardware communication unit 53 or the software communication by the software communication unit 52 based on the communication information (the priority for the user) extracted at Step S24 (Step S25).

The selection processing is processing for determining whether the hardware communication by the hardware communication unit 53 should be preferentially allocated to application communication by a predetermined user by comparing priority of the application communication with priority for other users who are likely to simultaneously perform communication. In this embodiment, priority of the application communication of the accounting user is set higher than priority of the application communication of the general (not-accounting) user. Therefore, the hardware communication by the hardware communication unit 53 is preferentially applied to the application communication of the accounting user.

Thereafter, the communication control unit 55 executes communication processing (Step S26) and stands by for the next communication request (Step S22).

Consequently, when a request for application communication (e.g., scan data transmission) to the client 4 of the general (not-accounting) user is received, the communication apparatus 2 processes a transmission packet in the software communication unit 52 and passes the transmission packet to the network communication driver 54. In other words, communication with the client 4 of the general (not-accounting) user is low-speed communication by the software processing. On the other hand, when a request for application communication (e.g., scan data transmission) to the client 4 of the accounting user is received, the communication apparatus 2 receives a transmission packet in the TOE 40 of the hardware communication unit 53 and passes the transmission packet to the network communication driver 54. In other words, communication with the client 4 of the accounting user is high-speed communication by the hardware processing.

In this way, according to this embodiment, the hardware communication by the hardware communication unit 53 is preferentially allocated to application communication for a user with high priority by referring to the priority (reference information) set in advance for each of the users related to a plurality of application communications simultaneously executed. Therefore, the TOE 40 is allocated to application communication with higher "priority of a communication using user". This makes it possible to realize improvement of communication performance in the overall communication (distribution of communication speed corresponding to necessity of speed of communication for the respective users).

In this embodiment, priority (reference information) for a user is determined according to whether the user is the general (not-accounting) user or the accounting user. However, the present invention is not limited to this. Priority (reference information) for a user may be determined according to a distinction of an administrator or a guest. Such distinction of an administrator or a guest can be received from an account list or an address book.

In this embodiment, the communication allocating unit 51 receives, from the outside, priority (reference information) determined in advance for each of users related to a plurality of application communications simultaneously executed and executes processing for application of the respective application communications to the hardware communication by the hardware communication unit 53 or the software communication by the software communication unit 52. This makes it possible to realize improvement of communication performance in the overall communication.

Figure 9:
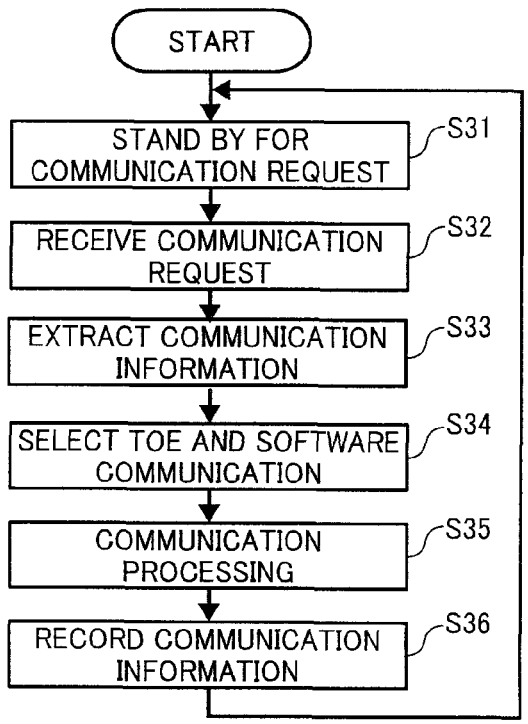
FIG. 9 is a flowchart of a flow of communication control processing according to a fourth embodiment of the present invention.
Figure 10:
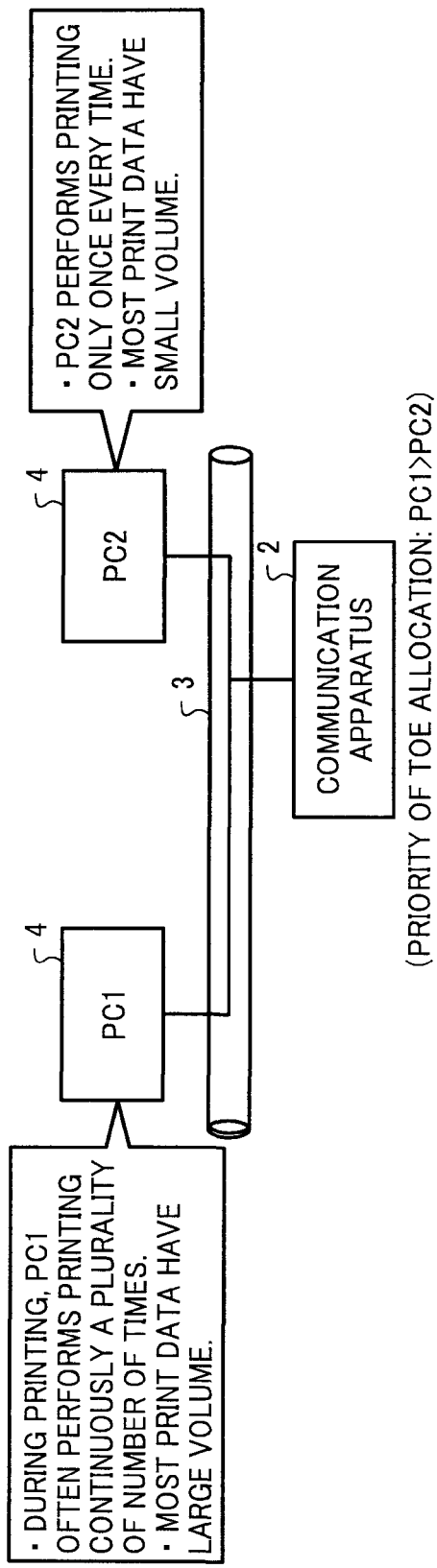
FIG. 10 is a diagram for explaining an example of allocation.

A fourth embodiment of the present invention is explained referring to FIGS. 9 and 10. Components same as those in the first embodiment are denoted by the same reference numerals and signs and explanation of the components is omitted.

In the first embodiment, the communication allocating unit 51 performs the processing for allocation of the hardware communication and the software communication based on a relative relation of information related to traffic of a plurality of application communications. However, a second embodiment is different from the first embodiment in that processing for allocation of the hardware communication and the software communication is performed according to a tendency of use of the client 4 as a communication object (reference information). The tendency of use of the client 4 as a communication object is, for example, a tendency of the number of prints, a tendency of printing frequency, a tendency of continuous printing, and a tendency of print data and scan data.

FIG. 9 is a flowchart of a flow of communication control processing by the communication control unit 55. As shown in FIG. 9, the communication control unit 55 stands by for a communication request (Step S31), receives a communication request "reception standby" from an application (Step S32), and extracts communication information from the communication request (Step S33). The communication information extracted at Step S33 is information concerning a tendency of use in the past (a tendency of the number of prints, a tendency of printing frequency, a tendency of continuous printing, and a tendency of print data and scan data, etc.) of the client 4 selected as a communication object.

Subsequently, the communication control unit 55 performs, using the communication allocating unit 51, processing for selecting the hardware communication by the hardware communication unit 53 or the software communication by the software communication unit 52 based on the communication information (the tendency of use in the past of the client 4 as a communication object) extracted at Step S33 (Step S34).

The selection processing is processing for analyzing the tendency of use of the client 4 as a communication object and selecting the hardware communication or the software communication to realize optimization of the overall communication based on a result of the analysis. In this embodiment, the selection processing is processing for determining whether the hardware communication by the hardware communication unit 53 should be preferentially allocated to application communication to a predetermined client 4 by comparing a tendency of use of the other clients 4 that are likely to simultaneously perform communication.

For example, as shown in FIG. 10, it is assumed that there are the client 4 (PC1) and the client 4 (PC2). The client 4 (PC1) has the following tendency of use:

During printing, the client 4 (PC1) often performs printing continuously a plurality of number of times; and Most of print data have a large volume.

On the other hand, the client 4 (PC2) has the following tendency of use:

During printing, the client 4 (PC1) performs printing only once every time; and Most of print data have a small volume. Therefore, in the example shown in FIG. 10, the tendency of use of the client 4 (PC1) tends to be used in such a way that a larger load is applied to communication. Therefore, the hardware communication by the hardware communication unit 53 is preferentially allocated to the application communication of the client 4 (PC1).

Thereafter, the communication control unit 55 executes communication processing for performing reception standby for the client 4 (PC2) in the software communication and performing reception standby for the client 4 (PC1), which tends to be used in such a way that a larger load is applied to communication, in the hardware communication (Step S35). The communication control unit 55 records contents of use of the client 4 as a communication object in the present communication in the RAM 15 and the HDD 18 as communication information (Step S36) and stands by for the next communication request (Step S31).

Consequently, concerning communication with a certain object, it is possible to predict contents of the communication from analysis of contents of communication in the past with the object. By allocating the hardware communication by the hardware communication unit 53 based on the prediction, it is possible to perform processing for preferentially allocating the hardware communication by the hardware communication unit 53 to communication that can be optimum as a whole.

In this embodiment, the processing for selecting the hardware communication by the hardware communication unit 53 or the software communication by the software communication unit 52 is performed according to a tendency of use of the client 4 as a communication object. However, the present invention is not limited to this. The hardware communication by the hardware communication unit 53 and the software communication by the software communication unit 52 can be allocated according to a communication object user. In this case, even when a user uses an image forming apparatus from another client 4, it is possible to perform allocation of the TOE 40 according to a tendency of use of the user.

As described above, according to this embodiment, the hardware communication by the hardware communication unit 53 is preferentially allocated to application communication to a communication object, which tends to be used in such a way that a large load is applied to communication, by referring to a tendency of user (reference information) of communication objects of a plurality of application communications simultaneously executed. This makes it possible to realize improvement of communication performance (an increase in average communication speed) in the overall communication.

Figure 11:
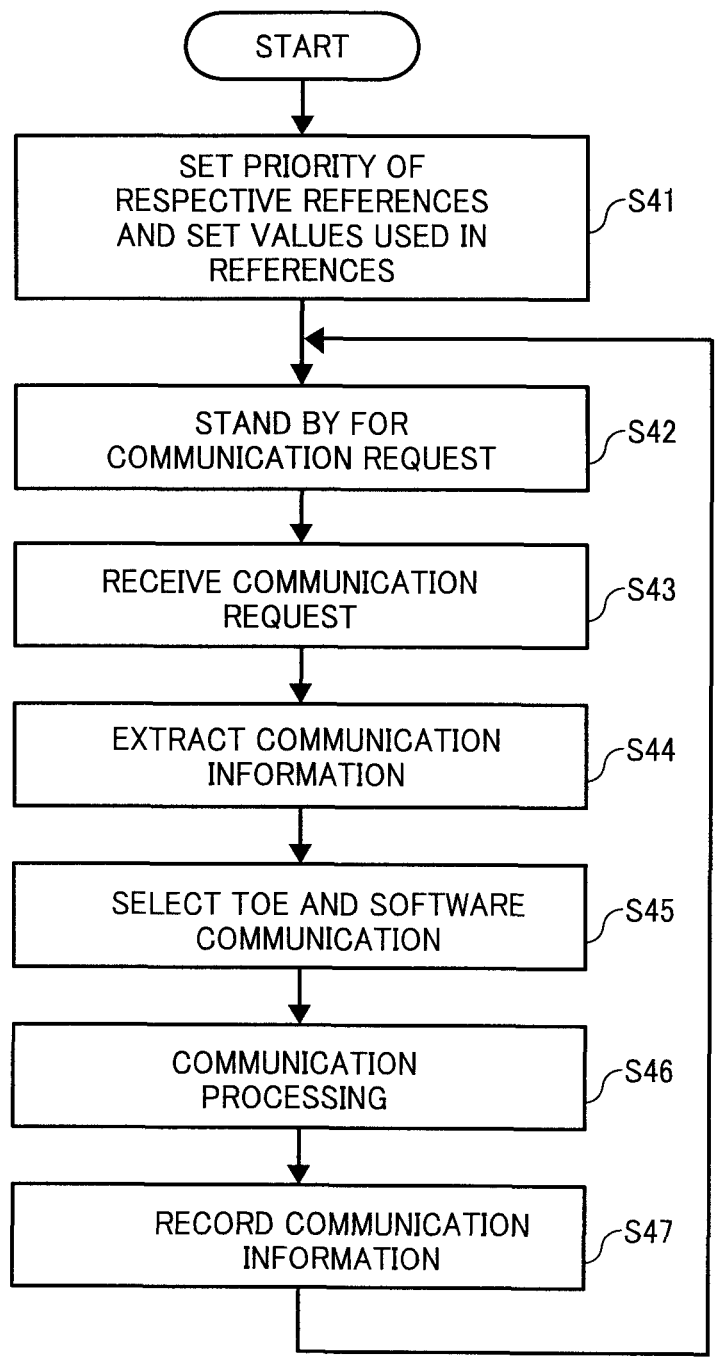
FIG. 11 is a flowchart of a flow of communication control processing according to a fifth embodiment of the present invention.
Figure 12:
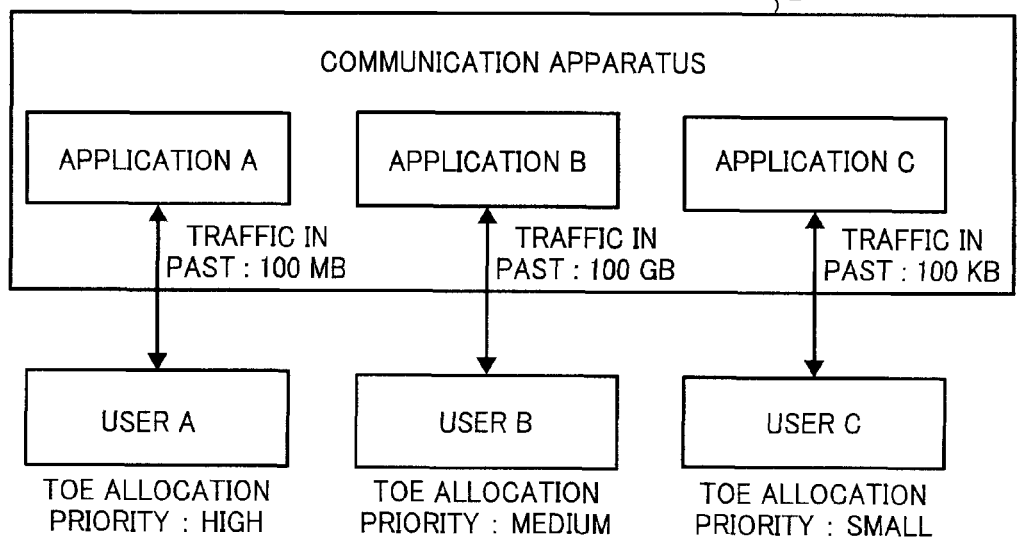
FIG. 12 is a diagram for explaining an example of allocation.

A fifth embodiment of the present invention is explained referring to FIGS. 11 and 12. Components same as those in the first embodiment are denoted by the same reference numerals and signs and explanation of the components is omitted.

In the first embodiment, the communication allocating unit 51 performs the processing for allocation of the hardware communication and the software communication based on a relative relation of information related to traffic of a plurality of application communications. However, the fifth embodiment is different from the first embodiment in that the processing for allocation of the hardware communication and the software communication is performed according to traffic as information related to traffic of a plurality of application communications (reference information) and priority for each of users (reference information).

FIG. 11 is a flowchart of a flow of communication control processing by the communication control unit 55. As shown in FIG. 11, first, the communication control unit 55 receives priority of respective references and setting of set values used in the references (Step S41). For example, in an example shown in FIG. 12, priority is given to two references. Application traffic in the past is the largest in an application B, user priority is the highest in a user A, and priority is higher in user priority than application traffic. Therefore, allocation priority of the TOE 40 (the hardware communication unit 53) is the highest in "communication between an application A and the user A". Such priority of the respective references and set values used in the references are recorded in the RAM 15 and the HDD 18.

Thereafter, the communication control unit 55 stands by for a communication request (Step S42), receives a communication request from an application (Step S43), and extracts communication information from the communication request (Step S44). The communication information extracted at Step S44 is the priority and the set values used in the respective references. In this embodiment, the communication information is traffic for each of the applications and allocation priority of the TOE 40 for each of the users.

Subsequently, the communication control unit 55 performs, using the communication allocating unit 51, processing for selecting the hardware communication by the hardware communication unit 53 or the software communication by the software communication unit 52 based on the communication information (the traffic for each of the applications and the allocation priority of the TOE 40 for each of the users) extracted at Step S44 (Step S45).

The selection processing is processing for selecting the hardware communication or the software communication according to a result of judgment of the respective references and a difference in priority among the references. More specifically, the selection processing is processing for judging, concerning predetermined communication, allocation priority of the TOE 40 for each of the references, calculating one allocation priority of the TOE 40 based on priority among the respective references from judged respective allocation priorities of the TOE 40, and allocating the TOE 40 more preferentially to communication with higher allocation priority.

Thereafter, the communication control unit 55 executes communication processing (Step S46) and, when there is a reference for which information needs to be recorded, records the information in the RAM 15 and the HDD 18 as communication information (Step S47) and stands by for the next communication request (Step S42).

Consequently, when new communication of an application is performed, it is possible to allocate the TOE 40 (the hardware communication unit 53) based on the traffic of the application and the priority for each of the users in the communication performed so far.

In this way, according to this embodiment, the software communication by the software communication unit 52 and the hardware communication by the hardware communication unit 53 are allocated to a plurality of application communications according to priority set in advance for at least two kinds of reference information. This makes it possible to realize improvement of communication performance in the overall communication in a flexible form matching an environment of use of the communication apparatus by combining and using a plurality of kinds of reference information for selection of allocation of the TOE 40.

A sixth embodiment of the present invention is explained referring to FIG. 13. Components same as those in the first embodiment are denoted by the same reference numerals and signs and explanation of the components is omitted.

In the first embodiment, the communication allocating unit 51 performs the processing for allocation of the hardware communication and the software communication based on a relative relation of information related to traffic of a plurality of application communications. However, the sixth embodiment is different from the first embodiment in that processing for allocation of the hardware communication and the software communication is performed according to whether IPsec communication is established by the hardware communication or the software communication.

The IPsec is a standard protocol for cipher communication and is a general term of a plurality of protocols such as a protocol for authentication and encryption, a protocol for key exchange, a header structure. In the IPsec, common key cryptography with light processing is used for encryption of data actually exchanged. In the IPsec, as a procedure before exchanging data with a common key, a logical connection is established. Such a logical connection is referred to as security association (SA). A term of validity is set for such SA.

In this embodiment, the communication apparatus 2 performs communication with the client 4. In this embodiment, an example of scan data transmission is described. However, it goes without saying that transmission and reception of other data can be performed in the same manner.

FIG. 13 is a flowchart of a flow of communication control processing of the communication control unit 55. As shown in FIG. 13, the communication control unit 55 stands by for a communication request (Step S51), receives a communication request to the client from an application of the communication apparatus 2 (Step S52), and extracts communication information from the communication request (Step S53). The communication information extracted at Step S53 is SA created in IPsec communication. The SA is created for exchanging and sharing encrypted information such as an encryption system and an encryption key and establishing a safe communication channel prior to communication in encrypted communication employing the IPsec. The SA created in the IPsec communication in this way is recorded in the RAM 15 and the HDD 18 when the software communication by the software communication unit 52 is used for the establishment of the IPsec. On the other hand, when the hardware communication by the hardware communication unit 53 is used for the establishment of the IPsec, the SA is recorded in the TOE 40.

The extraction of the SA by software is performed only when the software communication by the software communication unit 52 is used for the establishment of the IPsec. Therefore, in this embodiment, when the SA is extracted, it is seen that the software communication by the software communication unit 52 is used for the establishment of the IPsec. It is also possible that, if there is an application program interface that can check the SA recorded in the TOE 40, it is seen that the hardware communication by the hardware communication unit 53 is used for the establishment of the IPsec.

Subsequently, when the created SA is extracted at Step S53 and the SA is within the term of validity and can be used, the communication control unit 55 performs, using the communication allocating unit 51, processing for selection of the hardware communication by the hardware communication unit 53 or the software communication by the software communication unit 52 based on the SA (Step S54).

In the selection processing, when the created SA is extracted at Step S53 and the SA is within the term of validity and can be used, the communication control unit 55 judges that the software communication by the software communication unit 52 is used for the establishment of the IPsec. On the other hand, when the term of validity of the SA extracted at Step S53 has expired or when the SA is not extracted at Step S53, the communication control unit 55 judges that the hardware communication by the hardware communication unit 53 is used for the establishment of the IPsec between the communication apparatus 2 and the client 4. The hardware communication by the hardware communication unit 53 or the software communication by the software communication unit 52 for which the SA is already established is allocated to an application communication in which the IPsec SA can be reused.

Thereafter, the communication control unit 55 executes communication processing (Step S55). When the SA is created, the communication control unit 55 records information concerning the SA in the RAM 15 and the HDD 18 as communication information (Step S56) and stands by for the next communication request (Step S51).

Consequently, when a request for communication is received from the user, the communication apparatus 2 can determine whether a communication packet should be transmitted by the software communication unit 52 or the hardware communication unit 53 from the application through the communication allocating unit 51 and transmit the communication packet through the network communication driver 54.

In this way, according to this embodiment, when the SA (reference information) created for exchanging and sharing encrypted information and establishing a communication channel prior to encrypted communication employing the IPsec communication is extracted, it is judged that the software communication by the software communication unit 52 is used for the establishment of the IPsec. When the SA is not extracted, it is judged that the hardware communication by the hardware communication unit 53 is used for the establishment of the IPsec. The software communication by the software communication unit 52 or the hardware communication by the hardware communication unit 53 for which the SA is already established is allocated to application communication in which the IPsec SA can be reused. Therefore, it is possible to realize improvement of communication performance (a reduction in time necessary for IPsec processing) by allocating the TOE 40 to the "application communication in which the IPsec SA can be reused".

As explained in the fifth embodiment, when the software communication by the software communication unit 52 or the hardware communication by the hardware communication unit 53 is allocated to a plurality of application communications according to priority set in advance for at least two kinds of reference information and the SA is applied as reference information, if the SA is not extracted, the hardware communication by the hardware communication unit 53 is forced to be applied regardless of priority of the other kinds of reference information. Therefore, in such a case, the application is allowed to check whether communication is IPsec communication. Then, only when the communication is the IPsec communication, if the SA is not extracted, the hardware communication by the hardware communication unit 53 is forced to be allocated regardless of priority of the other kinds of reference information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus that processes a plurality of application communications executed in parallel in a network, the communication apparatus comprising:
    a software communication unit that executes the application communications according to a transmission control protocol/Internet protocol control using software;
    a hardware communication unit that executes the application communications according to a transmission control protocol/Internet protocol control using a transmission control protocol/Internet protocol offload engine (TOE); and
    a communication allocating unit that executes an allocation processing for allocating each of application communications that are simultaneously executed to one of the software communication unit to execute the application communication as a software communication and the hardware communication unit to execute the application communication as a hardware communication, based on reference information on each of the application communications,
    wherein the reference information includes security association that is generated for exchanging and sharing encrypted information and for establishing a communication channel prior to an encrypted communication using secure Internet protocol communication, and the communication allocating unit extracts the security association from each of the application communications, and
    wherein when the security association is extracted from each of the application communications and the extracted security association is within a term of validity so as to be usable, the extracted security association is based on the transmission control protocol/Internet protocol control using the software, and the communication allocating unit determines that the software communication by the software communication unit is used to establish the secure Internet protocol communication, and
    when the term of validity of the security association has expired, the communication allocating unit determines that the hardware communication by the hardware communication unit is used to establish the secure Internet protocol communication.

2. The communication apparatus according to claim 1, wherein the communication allocating unit allocates an application communication capable of reusing the security association for the secure Internet protocol communication to one of the software communication unit for which the security association is already established and the hardware communication unit.

3. The communication apparatus according to claim 1, wherein
the reference information includes traffic history information related to a traffic of each of the application communications, and
the communication allocating unit preferentially allocates an application communication with a relatively large amount of traffic based on the. traffic history information, as compared to others of the application communications, to the hardware communication unit.

4. The communication apparatus according to claim 1, wherein
the reference information includes a priority that is set in advance for each of the application communications, and
the communication allocating unit preferentially allocates an application communication having a higher priority, as compared to others of the application communications, to the hardware communication unit.

5. The communication apparatus according to claim 1, wherein
the reference information includes a priority that is set in advance for each of users of the application communications, and
the communication allocating unit preferentially allocates an application communication related to a user having a higher priority, as compared to others of the application communications, to the hardware communication unit.

6. The communication apparatus according to claim 1, wherein
the reference information includes a usage tendency of each of communication targets of the application communications, and
the communication allocating unit preferentially allocates an application communication for a communication target that tends to place a larger load on the application communication, as compared to others of the application communications, to the hardware communication by the hardware communication unit to an application communication for a communication target that tends to place a larger load to a communication.

7. The communication apparatus according to claim 1, wherein
the reference information includes at least two pieces of information from among pieces of information related to a traffic of each of the application communications, a priority set in advance for each of the application communications, a priority set in advance for each of users of the application communications, and a usage tendency of each of communication targets of the application communications, and
the communication allocating unit allocates each of the application communications to one of the software communication unit and the hardware communication unit according to priorities that are set in advance for the at least two pieces of the information.

8. The communication apparatus according to claim 1, wherein the communication allocating unit analyzes the reference information on the application communications that are simultaneously executed, and executes the allocation processing for each of the application communications.

9. The communication apparatus according to claim 1, wherein the communication allocating unit receives the reference information on the application communications that are simultaneously executed from an external apparatus, and executes the allocation processing for each of the application communications.

10. The communication apparatus according to claim 1, wherein when the security association is recorded in the TOE, the hardware communication by the hardware communication unit is used to establish the secure Internet protocol communication.

11. A method for executing a plurality of application communications executed in parallel in a network, the method comprising:
allocating each of application communications that are simultaneously executed to one of a software communication unit that executes the application communications as software communications according to a transmission control protocol/Internet protocol control using software and a hardware communication unit that executes the application communications as hardware communications according to a transmission control protocol/Internet protocol control using a transmission control protocol/Internet protocol offload engine (TOE), based on reference information on each of the application communications,
wherein the reference information includes security association for exchanging and sharing encrypted information and for establishing a communication channel prior to an encrypted communication using secure Internet protocol communication, and
wherein when the security association is extracted from each of the application communications and the extracted security association is within a term of validity so as to be usable, the extracted security association is based on the transmission control protocol/Internet protocol control using the software, and the software communication by the software communication unit is used to establish the secure Internet protocol communication, and
when the term of validity of the security association has expired, the hardware communication by the hardware communication unit is used to establish the secure Internet protocol communication.

12. The method according to claim 11, wherein
an application communication capable of reusing the security association for the secure Internet protocol communication is allocated to one of the software communication unit for which the security association is already established and the hardware communication unit.

13. The method according to claim 11, wherein
the reference information includes at least two pieces of information from among pieces of information related to a traffic of each of the application communications, a priority set in advance for each of the application communications, a priority set in advance for each of users of the application communications, and a usage tendency of each of communication targets of the application communications, and
each of the application communications is allocated to one of the software communication unit and the hardware communication unit according to priorities that are set in advance for the at least two pieces of the information.

14. A computer program product comprising a non-transitory computer-usable medium having computer-readable program codes embodied in the medium for executing a plurality of application communications executed in parallel in a network, the computer-readable program codes when executed causing a computer to execute:
- allocating each of application communications that are simultaneously executed to one of a software communication unit that executes the application communications as software communications according to a transmission control protocol/Internet protocol control using software and a hardware communication unit that executes the application communications as hardware communications according to a transmission control protocol/Internet protocol control using a transmission control protocol/Internet protocol offload engine (TOE), based on reference information on each of the application communications,
- wherein the reference information includes security association for exchanging and sharing encrypted information and for establishing a communication channel prior to an encrypted communication using secure Internet protocol communication, and
- wherein when the security association is extracted from each of the application communications and the extracted security association is within a term of validity so as to be usable, the extracted security association is based on the transmission control protocol/Internet protocol control using the software, and the software communication by the software communication unit is used to establish the secure Internet protocol communication, and
- when the term of validity of the security association has expired, the hardware communication by the hardware communication unit is used to establish the secure Internet protocol communication.

15. The computer program product according to claim 14, wherein
- an application communication capable of reusing the security association for the secure Internet protocol communication is allocated to one of the software communication unit for which the security association is already established and the hardware communication unit.

16. The computer program product according to claim 14, wherein
- the reference information includes at least two pieces of information from among pieces of information related to a traffic of each of the application communications, a priority set in advance for each of the application communications, a priority set in advance for each of users of the application communications, and a usage tendency of each of communication targets of the application communications, and
- each of the application communications is allocated to one of the software communication unit and the hardware communication unit according to priorities that are set in advance for the at least two pieces of the information.

* * * * *